(12) United States Patent
Okamoto et al.

(10) Patent No.: US 7,865,093 B2
(45) Date of Patent: Jan. 4, 2011

(54) PRINTING DEVICE, PRINTING METHOD AND PRINTING SYSTEM

(75) Inventors: Yoshinari Okamoto, Aichi (JP); Satoru Okada, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 54 days.

(21) Appl. No.: 12/250,952

(22) Filed: Oct. 14, 2008

(65) Prior Publication Data
US 2009/0129794 A1 May 21, 2009

(30) Foreign Application Priority Data
Nov. 21, 2007 (JP) .............................. 2007-301268

(51) Int. Cl.
G03G 15/00 (2006.01)
G03G 21/00 (2006.01)

(52) U.S. Cl. ................. 399/38; 399/9; 399/27; 399/82

(58) Field of Classification Search ............ 399/38, 399/27, 82, 9
See application file for complete search history.

(56) References Cited

U.S. PATENT DOCUMENTS

| | | | |
|---|---|---|---|
| 6,238,034 | B1 | 5/2001 | Ono |
| 7,203,436 | B2* | 4/2007 | Imamiya ............... 399/53 |
| 2004/0141194 | A1 | 7/2004 | Gupta et al. |
| 2004/0252314 | A1 | 12/2004 | Takahashi |
| 2006/0083523 | A1* | 4/2006 | Kang .................. 399/27 |
| 2006/0203029 | A1 | 9/2006 | Nishida et al. |
| 2008/0226310 | A1* | 9/2008 | Togami ................ 399/27 |
| 2009/0080007 | A1* | 3/2009 | Enomoto ............. 358/1.9 |

FOREIGN PATENT DOCUMENTS

| | | |
|---|---|---|
| JP | 06-008474 A | 1/1994 |
| JP | 7-256931 | 10/1995 |
| JP | 2000-326521 A | 11/2000 |
| JP | 2001-051555 | 2/2001 |
| JP | 2004-229281 A | 8/2004 |
| JP | 2004-302752 | 10/2004 |
| JP | 2005-049584 | 2/2005 |
| JP | 2006-211161 A | 8/2006 |
| JP | 2006-247965 A | 9/2006 |
| JP | 2006-281445 A | 10/2006 |

OTHER PUBLICATIONS

Machine translation of JP 2006-211161 A dated Apr. 11, 2010.*
JP Office Action dtd Nov. 24, 2009, JP Appln. 2007-301268, English translation.
JP Office Action dtd May 25, 2010, JP Appln. 2007-301268, English Translation.
JP Office Action dtd Oct. 12, 2010, JP Appln. 2007-301268, English Translation.

* cited by examiner

*Primary Examiner*—Sophia S Chen
(74) *Attorney, Agent, or Firm*—Banner & Witcoff, Ltd.

(57) ABSTRACT

A printing device includes a printing unit which prints an image on a sheet according to a print command, a judgment unit which judges whether a total adhesion amount of a print agent adhering to the sheet for the image printing exceeds a prescribed threshold value based on inputted print data, and a control unit which executes a process for reducing the total adhesion amount of the print agent when the total adhesion amount is judged to exceed the threshold value by the judgment unit.

15 Claims, 9 Drawing Sheets

PRINTING DEVICE, PRINTING METHOD AND PRINTING SYSTEM

CROSS-REFERENCE TO RELATED APPLICATION

This application claims priority under 35 U.S.C. §119 from Japanese Patent Application No. 2007-301268 filed on Nov. 21, 2007. The entire subject matter of the application is incorporated herein by reference.

BACKGROUND

1. Technical Field

The present invention relates to a printing device, a printing method and a printing system for executing printing on a sheet (e.g. paper) according to inputted print data, and in particular, to a printing device, a printing method and a printing system capable of implementing the printing while taking recycling of the printed sheet into account.

2. Prior Art

An increasing amount of printed paper is being recycled and reused as recycled paper in recent years. In the recycling of printed paper, the quality of the recycled paper obtained by the recycling is deteriorated by diffusion of a print agent (ink, toner, etc. used for the printing) throughout the recycled paper if a large amount of print agent has adhered to the printed paper.

To address the problem, a technique described in Japanese Patent Provisional Publication No. 2001-51555 calculates an adhesion ratio of the print agent on each sheet (area ratio between the print agent (adhering to the sheet) and the sheet) and displaying (printing) information about the recycling of the printed sheet on the sheet based on the calculated adhesion ratio.

SUMMARY OF THE INVENTION

However, even with the technique, the recycling of the printed sheet (to obtain recycled paper of acceptable quality) is still impossible when an excessive amount of print agent disabling the recycling has adhered to the sheet.

The present invention, which has been made in consideration of the above problems, is advantageous in that a printing device and a printing system, capable of executing the printing of print data on a sheet while taking account of the possibility of recycling of the printed sheet even when the print data involves an excessive amount of the print agent adhering to the sheet (excessive adhesion amount) and disables the recycling if the printing is carried out without modification, can be provided.

In accordance with an aspect of the present invention, there is provided a printing device comprising a printing unit which prints an image on a sheet according to a print command, a judgment unit which judges whether a total adhesion amount of a print agent adhering to the sheet for the image printing exceeds a prescribed threshold value or not based on inputted print data, and a control unit which executes a process for reducing the total adhesion amount of the print agent when the total adhesion amount is judged to exceed the threshold value by the judgment unit.

With the printing device configured as above, the process for reducing the total adhesion amount of the print agent is executed by the control unit when the total adhesion amount is judged by the judgment unit to exceed the threshold value based on the print data. Thus, even in the printing of print data involving a large total adhesion amount (disabling the recycling of the printed sheet if the printing is carried out without modification), the printing can be carried out while taking account of the possibility of the recycling, by the reduction of the total adhesion amount of the print agent.

In accordance with another aspect of the present invention, there is provided a printing system comprising an upper-level device which forms print data, a lower-level device which prints an image on a sheet according to the print data formed by the upper-level device, a judgment unit which judges whether a total adhesion amount of a print agent adhering to the sheet for the image printing exceeds a prescribed threshold value or not based on the print data, and a control unit which executes a process for reducing the total adhesion amount of the print agent when the total adhesion amount is judged to exceed the threshold value by the judgment unit.

With the printing system configured as above, the process for reducing the total adhesion amount of the print agent is executed by the control unit when the total adhesion amount is judged by the judgment unit to exceed the threshold value based on the print data. Thus, even in the printing of print data involving a large total adhesion amount (disabling the recycling of the printed sheet if the printing is carried out without modification), the printing can be carried out while taking account of the possibility of the recycling, by the reduction of the total adhesion amount of the print agent.

Incidentally, the judgment unit and the control unit may either be placed in the upper-level device or in the lower-level device, or properly distributed into the upper-level device and the lower-level device. It is also possible to place the judgment unit and the control unit in a device other than the upper-level device or the lower-level device.

In accordance with another aspect of the present invention, there is provided a printing method for a printing device which prints an image by adhering print agent on a sheet according to inputted print data and an inputted print command, comprising the steps of setting a threshold value of an amount of the print agent per sheet as a prescribed threshold value, calculating a total adhesion amount of the print agent per sheet based on the inputted print data and the inputted print command, judging whether the total adhesion amount of the print agent per sheet exceeds the prescribed threshold value, and reducing the total adhesion amount of the print agent per sheet when the total adhesion amount is judges to exceed the prescribed threshold value.

Other objects, features and advantages of the present invention will become more apparent from the consideration of the following detailed description taken in conjunction with the accompanying drawings.

DETAILED DESCRIPTION OF THE EMBODIMENTS

Referring now to the drawings, a description will be given in detail of a preferred embodiment in accordance with the present invention.

<Overall Configuration of Printing Device>

Figure 1:
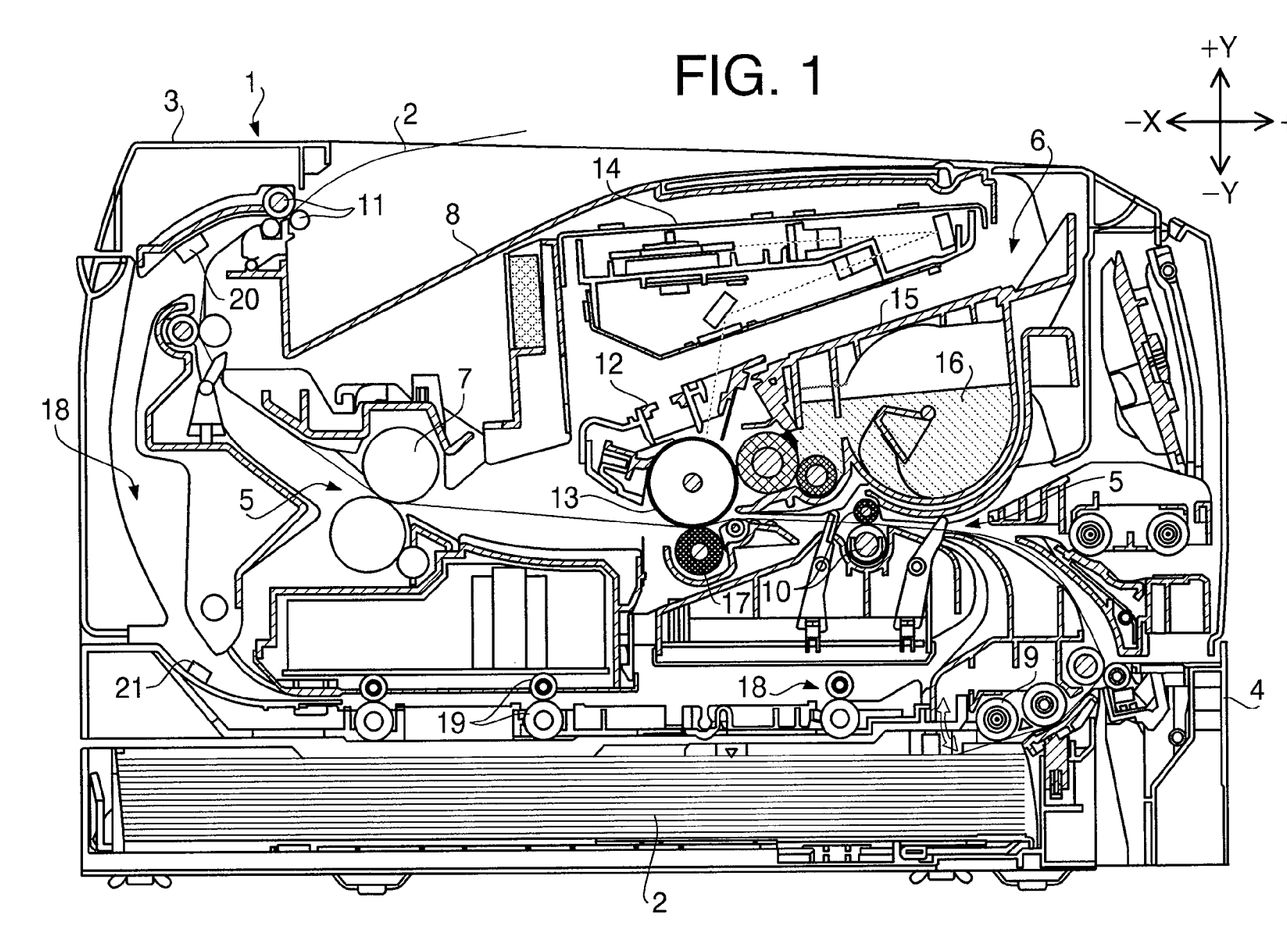
FIG. 1 is a sectional side view showing the general composition of a printer in accordance with an embodiment of the present invention.

FIG. 1 is a sectional side view showing the general composition of a printer 1 as an example of a printing device (or a lower-level device in a printing system) in accordance with an embodiment of the present invention. In FIG. 1, an X-axis is set in the horizontal direction and a Y-axis is set in the vertical direction for convenience of explanation. Incidentally, the printing device in accordance with this embodiment is not restricted to a printer; the present invention is applicable also to various other printing devices such as copy machines and MFPs (Multi-Function Peripherals).

The printer 1 executes printing on a sheet 2 (e.g. paper) based on image data received from an upper-level device 55 (personal computer, server, etc.) which will be described later (see FIG. 2) or an external storage device 56 (digital camera, USB memory, etc.) which will be described later (see FIG. 2). A printing system in accordance with an embodiment of the present invention is formed by the printer 1 and the upper-level device 55.

As shown in FIG. 1, a sheet feed tray 4 (storing a stack of sheets 2) is contained in the base (−Y side in FIG. 1) of the body 3 of the printer 1. Inside the body 3, a first feeding path 5 is formed to feed the sheet 2 (extracted from the sheet feed tray 4) to a print unit 6 and to the outside of the body 3 (output tray 8). Along the first feeding path 5, the print unit 6 and a fixation unit 7 (on the downstream side of the print unit 6) are placed. An output tray 8 is formed on the top (+Y side in FIG. 1) of the body 3. The sheet 2 after being printed on by the print unit 6 is fed through the first feeding path 5 and ejected to the output tray 8.

For the feeding of the sheet 2, the first feeding path 5 is equipped with a sheet feed roller 9, registration rollers 10 and sheet ejection rollers 11. A first feeding unit of the printer 1 is formed by the sheet feed roller 9, the registration rollers 10 and the sheet ejection rollers 11. In the printer 1, a single-side printing unit, (part of) a multiple-page printing unit and (part of) a printing unit are implemented by the first feeding path 5 (or the first feeding unit), the print unit 6, the fixation unit 7, a CPU 51 (see FIG. 2), a ROM 52 (see FIG. 2) and a RAM 53 (see FIG. 2). The CPU 51, the ROM 52 and the RAM 53 will be described later. The sheet feed roller 9, the registration rollers 10 and the sheet ejection rollers 11 are rotated by driving force of a motor M (see FIG. 2) which is linked with the rollers.

The sheet feed roller 9 (as a feeding unit), which is placed at the front (+X side) of the sheet feed tray 4, picks up one sheet 2 stored in the sheet feed tray 4 and feeds the sheet 2 toward the registration rollers 10. The registration rollers 10, which are placed on the upstream side of the print unit 6, correct the skewing of the sheet 2 and feed the aligned (registered) sheet toward the print unit 6. Along the first feeding path 5, a sheet feed unit is formed by the sheet feed tray 4, the sheet feed roller 9 and the registration rollers 10.

The sheet ejection rollers 11 (as an ejection unit), which are placed on the downstream side of the print unit 6, eject the sheet 2 to the output tray 8. Along the first feeding path 5, a sheet ejection unit is formed by the sheet ejection rollers 11 and the output tray 8.

The print unit 6 includes a charging unit 12, a photosensitive drum 13, a scanner unit 14, a toner cartridge 15, toner 16 and a transfer roller 17. The print unit 6 forms (prints) an image on the sheet 2 according to inputted image data. Incidentally, while the toner 16 is used as the print agent in this embodiment, other print agents (e.g. ink) may be used when the print unit 6 is implemented as an inkjet printing unit.

The charging unit 12 is placed in the vicinity of the photosensitive drum 13. The surface of the photosensitive drum 13, after being electrically charged by the charging unit 12, is irradiated with a laser beam emitted and scanned by the scanner unit 14, by which an electrostatic latent image is formed on the drum surface. The electrostatic latent image on the photosensitive drum 13 is visualized (developed into a "toner image") by use of the toner 16 supplied from the toner cartridge 15. The transfer roller 17 is placed to closely face the photosensitive drum 13. The sheet 2 fed from the registration rollers 10 is sandwiched between the photosensitive drum 13 and the transfer roller 17, by which the toner image on the photosensitive drum 13 is transferred to the sheet 2.

The fixation unit 7 on the downstream side of the photosensitive drum 13 heat-fixes the image which has been transferred to the sheet 2.

In the base (−Y side in FIG. 1) of the body 3, a second feeding path 18 to be used for duplex printing is formed between the first feeding path 5 and the sheet feed tray 4. The second feeding path 18 is equipped with relay rollers 19 for feeding the sheet 2. The relay rollers 19 are rotated by driving force of the motor M (see FIG. 2) which is linked with the rollers. A second feeding unit of the printer 1 is formed by the relay rollers 19. In the printer 1, a duplex printing unit, the multiple-page printing unit and the printing unit are implemented by the single-side printing unit and the second feeding path 18 (or the second feeding unit).

The front end (+X side in FIG. 1) of the second feeding path 18 connects to an upstream part (sheet feed unit's side) of the first feeding path 5 between the sheet feed roller 9 and the registration rollers 10. Meanwhile, the rear end (−X side in FIG. 1) of the second feeding path 18 connects to a downstream part (sheet ejection unit's side) of the first feeding path 5 between the fixation unit 7 and the sheet ejection rollers 11. A sheet ejection sensor 20 is placed on the upstream side of the sheet ejection rollers 11. A reverse sheet feed sensor 21 is placed in an upstream part (−X side in FIG. 1) of the second feeding path 18.

The printer 1 further includes an operation unit 59 (see FIG. 2) and a display unit 60 (see FIG. 2) as user interfaces.

With the above configuration, the printer 1 is capable of not only the single-side printing (printing on one side of the sheet 2 supplied from the sheet feed tray 4) but also the duplex printing (printing on both sides of the sheet 2).

Incidentally, while the printer 1 of this embodiment (equipped with only one toner cartridge 15) is only capable of single-color printing using a single-color toner 16, this embodiment is applicable also to a color printer which is equipped with multiple toner cartridges 15 in the print unit 6 and capable of multicolor printing using multiple color toners 16 (e.g. yellow, magenta, cyan and black).

<Printing Process>

Here, a single-side printing process and a duplex printing process of the printer 1 will be explained briefly with reference to FIG. 1.

First, the single-side printing process will be described.

When a single-side print command from the upper-level device 55 is received by a control unit 50 which will be described later (see FIG. 2), a sheet 2 is picked up from the sheet feed tray 4 and fed to the registration rollers 10 by the sheet feed roller 9. By the registration rollers 10, the sheet 2 is aligned (registered) and then fed to the print unit 6. In the print unit 6, an image is printed on the sheet 2 by the transfer of the toner image from the photosensitive drum 13. The image printed on the sheet 2 is heat-fixed by the fixation unit 7. After the heat fixing, the sheet 2 is ejected to the output tray 8 by the sheet ejection rollers 11, with the printed surface facing downward.

Incidentally, while the order of the printing of the image data (pages) is modified in the duplex printing process which will be described below, the printing in the single-side printing process is carried out in the normal order (the pages (image data) are successively printed on the sheets 2 starting from the first page).

Next, the duplex printing process will be described.

When a duplex print command from the upper-level device 55 is received by the control unit 50 which will be described later (see FIG. 2), an image is printed on one surface of the sheet 2 by the above single-side printing process. After the heat fixing by the fixation unit 7, the sheet 2 is fed to the downstream part of the first feeding path 5. When the rear end of the sheet 2 is detected by the sheet ejection sensor 20, the rotation of the sheet ejection rollers 11 is reversed, by which the sheet 2 is fed reversely (upstream) from the downstream end of the first feeding path 5. In this case, the sheet 2, having proper elasticity, enters the second feeding path 18 instead of returning to the first feeding path 5, and is fed by the relay rollers 19 to the sheet feed unit's side (+X side in FIG. 1).

The rotation of the sheet ejection rollers 11 is reversed again (to the normal direction) when the rear end of the sheet 2 is detected by the reverse sheet feed sensor 21. After being fed to the sheet feed unit's side of the first feeding path 5 via the second feeding path 18, the sheet 2 is fed again to the print unit 6. In the print unit 6, an image is printed on the back (which has not been printed on yet) of the sheet 2. The sheet 2 after the duplex printing is ejected to the output tray 8 with the back facing downward; that is, with the front (which was printed on first) facing upward.

Incidentally, the printer 1 of this embodiment carries out the duplex printing so that the sheets 2 are ejected to the output tray 8 with the first page of the image data (printed on the first sheet) facing downward. Thus, in the duplex printing, the front of the sheet 2 is printed on first with the second page (even-numbered page) of the image data, and thereafter the back of the sheet 2 is printed on with the first page (odd-numbered page) of the image data.

<Control Configuration of Printer>

Figure 2:
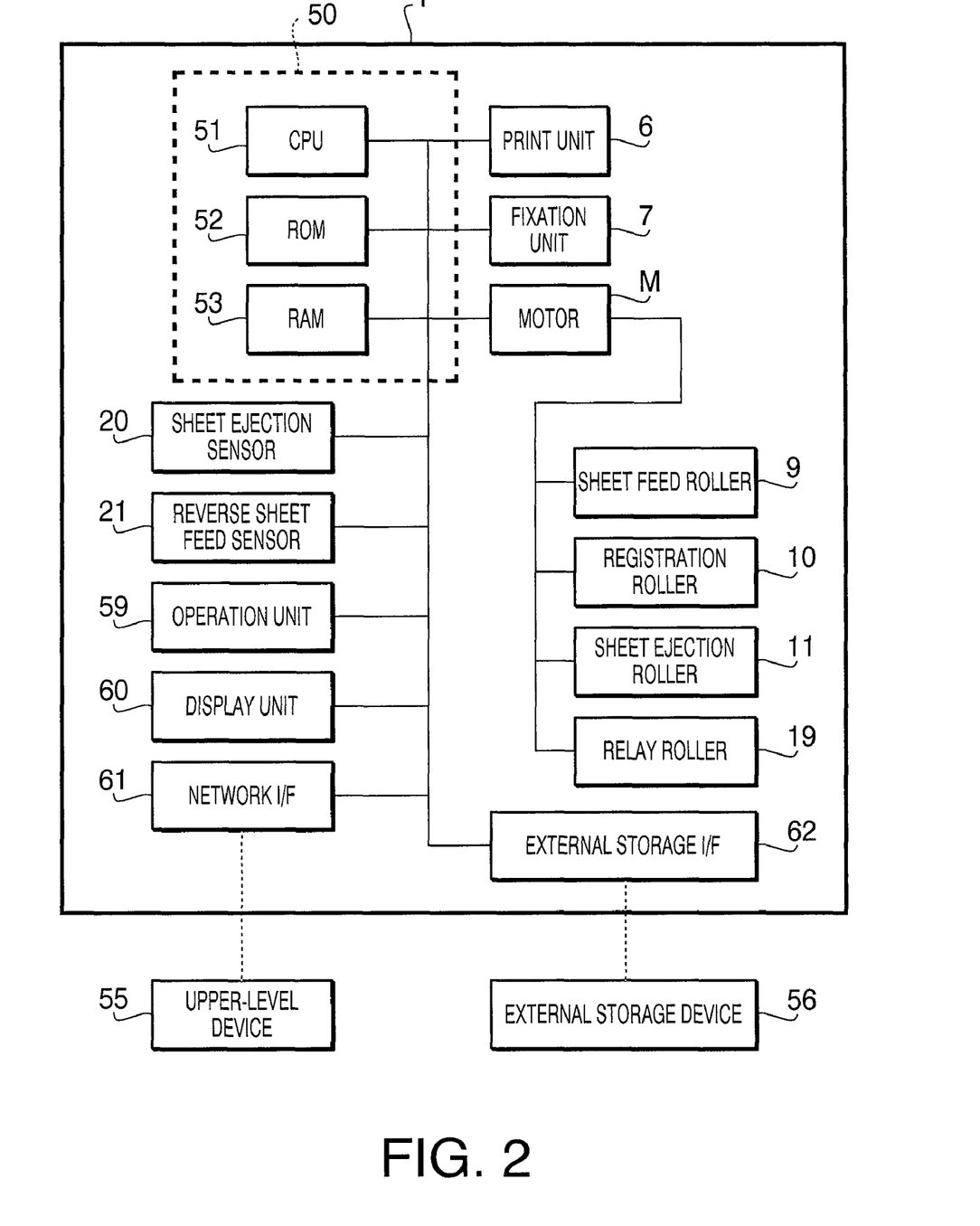
FIG. 2 is a block diagram showing the control configuration of the printer.

FIG. 2 is a block diagram showing the control configuration of the printer 1.

The printer 1 is controlled by the control unit 50 (as a unit for calculation, judgment and control) which is implemented by a well-known computer, in which the ROM 52 and the RAM 53 are connected to the CPU 51. A print program, for the control of a variety of operation/driving of the printer 1, has been stored in the ROM 52. Results of processing, data during processing, etc. are temporarily stored in the RAM 53. The print program stored in the ROM 52 is executed by the CPU 51. Incidentally, a normal print program and a recycling print program have been stored in the ROM 52 as the print program.

The operations of the print unit 6, the fixation unit 7 and the motor M are controlled by the CPU 51 which is connected therewith. The sheet feed roller 9, the registration rollers 10, the sheet ejection rollers 11 and the relay rollers 19 are linked with the motor M via gears (not shown), and thus the driving of the rollers is also controlled by the CPU 51.

Further, the upper-level device 55 and the external storage device 56 are detachably connected to the CPU 51 via a network I/F (interface) 61 and an external storage I/F 62, respectively. The CPU 51 of the printer 1 can receive image data transmitted from the upper-level device 55 or the external storage device 56.

Incidentally, the connection of the CPU 51 (printer 1) with the upper-level device 55 is not restricted to the connection via the network I/F 61; direct connection using a printer port (USB port, RS232C port, etc.), network connection using a wireless LAN, etc. are also possible.

The upper-level device 55 is capable of transmitting a print command to the CPU 51 (printer 1) via a printer driver. Being transmitted from the upper-level device 55 together with print data, the print command makes the printer 1 execute the printing of the print data. The print data includes image data for the printing of X pages, print mode data specifying a print mode, and print method data specifying a print method.

The print mode data is data specifying a selection between a normal print mode and a recycling print mode which will be explained later. The print method data is data specifying a selection between the single-side printing (printing on one side of the sheet 2) and the duplex printing (printing on both sides of the sheet 2) and a selection on whether "N-in-1 printing" (explained later) should be executed or not.

The ROM 52 has further stored an adhesion ratio calculation program. Bitmap data is generated by the CPU 51 based on the received image data. Based on the generated bitmap data, the adhesion ratio calculation program calculates the number C of dots to be printed on the sheet 2, and thereby obtains a toner adhesion area T (total area of the toner adhering to the sheet 2). Based on the obtained toner adhesion area T and the area P of the sheet 2, an adhesion ratio D of the toner 16 on the sheet 2 is calculated as $D=T/P\times100$ (%).

It is also possible to make the calculation unit (made up of the CPU 51, the ROM 52 and the RAM 53) calculate a total adhesion amount QP (total amount of the toner 16 used) from the number C of dots or the adhesion ratio D. While the control in this embodiment is executed by use of the adhesion ratio D of the toner 16 on the sheet 2, the control may also be carried out using the number C of dots or the total adhesion amount QP.

The ROM 52 has further stored an adhesion amount control program. The adhesion amount control program adjusts development bias of the toner 16, by which a dot adhesion amount QD of the toner 16 adhering to the photosensitive drum 13 is adjusted, by which the total adhesion amount QP of the toner 16 adhering to the sheet 2 (i.e. the dot adhesion amount QD (per dot)×the number C of dots) is adjusted.

Incidentally, while the total adhesion amount QP is controlled by the adhesion amount control program as above, the control by the adhesion amount control program may be carried out differently.

For example, the adhesion amount control program may be designed to adjust output voltage of the charging unit 12, by which the amount of electric charge on the photosensitive drum 13 is adjusted, the dot adhesion amount QD of the toner 16 adhering to the photosensitive drum 13 is adjusted, and the total adhesion amount QP of the toner 16 adhering to the sheet 2 (i.e. the dot adhesion amount QD (per dot)×the number C of dots) is adjusted.

The adjustment of the total adhesion amount QP may also be made by controlling the intensity (light amount) of the laser of the scanner unit 14. By this method, the electric potential on the surface of the photosensitive drum 13 is adjusted, the dot adhesion amount QD of the toner 16 per dot is controlled, and the total adhesion amount QP of the toner 16 adhering to the sheet 2 is adjusted.

It is also possible to control the number C of dots (of the image data to be printed) by a process in which some of the bits of the bitmap data (generated based on the image data) are skipped over (masked).

Further, the adjustment of the total adhesion amount QP of the toner 16 adhering to the sheet 2 may also be made by combining some of the above methods (e.g. by controlling both the number C of dots and the dot adhesion amount QD of the toner 16 per dot).

The operation unit 59 and the display unit 60, connected to the CPU 51, serve as user interfaces in cases where the print command is inputted to the printer 1 by the user. The input of the print command by the user through the operation unit 59 is made in a state in which the image data has already been received from the upper-level device 55 or the external storage device 56 and stored in the RAM 53. In this case, the aforementioned print mode data and print method data are inputted by the user through the operation unit 59 and the printing is executed according to the inputted print mode/method data.

In other words, the print mode and the print method may be specified by not only the upper-level device 55. For example, the printer 1 may receive only image data from the upper-level device 55 while letting the user specify the print mode and the print method through the operation unit 59 and the display unit 60. The print mode and the print method may also be stored previously in the external storage device 56 storing image data.

Also connected to the CPU 51 are the sheet ejection sensor 20 and the reverse sheet feed sensor 21, by which the feeding status of the sheet 2 is detected. The rotational direction of the sheet ejection rollers 11 is controlled by the CPU 51 depending on the detected feeding status.

While the adhesion ratio calculation program and the adhesion amount control program are stored in the ROM 52 of the printer 1 and the units for the calculation, judgment and control (implemented by the control unit 50) are also placed in the printer 1 in the control configuration of FIG. 2, the configuration of the printing system in accordance with this embodiment is not restricted to that of FIG. 2. For example, the adhesion ratio calculation program and the adhesion amount control program may be stored not in the printer 1 but in the upper-level device 55. The calculation unit, judgment unit and control unit may also be placed not in the printer 1 but in the upper-level device 55, or properly distributed into the printer 1 and the upper-level device 55.

The calculation of the adhesion ratio D and the control of the total adhesion amount QP (which are executed only for the single-color toner 16 in this embodiment) may also be conducted for color toners 16 (e.g. yellow, magenta, cyan and black). In this case, more refined sorting of printed sheets for the recycling can be realized by carrying out the calculation of the adhesion ratio D and the control of the total adhesion amount QP for each of the color toners 16.

<Operation of Printer>

In the following, the operation of the printer 1 of this embodiment will be described with reference to flow charts of FIGS. 3-7 and print image examples shown in FIGS. 8 and 9. Incidentally, FIGS. 3-7 (which are linked together) indicate one process (including several processes described below) which is executed by the control unit 50 (CPU 51) of the printer 1.

(Print Mode/Method Judgment Process)

Figure 3:
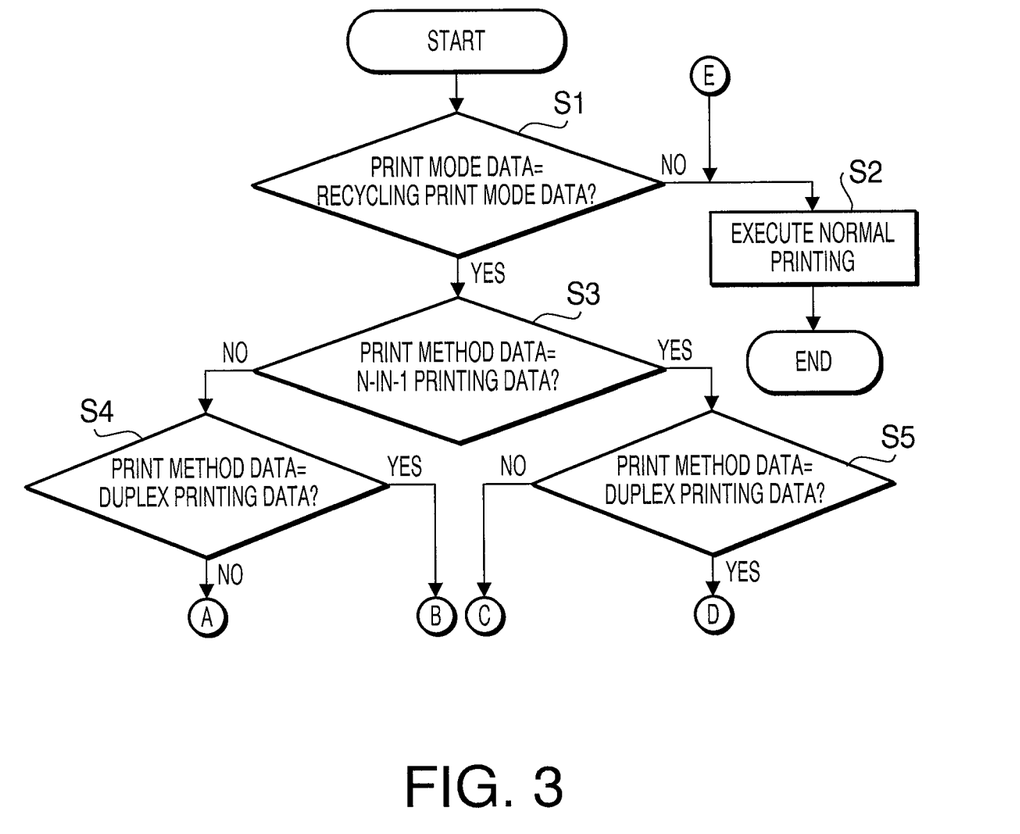
FIG. 3 is a flow chart showing a print mode/method judgment process which is executed by the CPU of the printer.

FIG. 3 is a flow chart showing a print mode/method judgment process which is executed by the CPU 51. First, the print mode/method judgment process will be explained below referring to FIG. 3.

The print program (for the process shown in FIGS. 3-7) is carried out by the CPU 51 when the print command is executed due to transmission of print data from the upper-level device 55 to the CPU 51, or when the print command is issued by the upper-level device 55 or by the user through the operation unit 59 of the printer 1 after transmission of print data from the external storage device 56 to the CPU 51.

As shown in FIG. 3, the CPU 51 first judges whether the print mode data is recycling print mode data (specifying a recycling print mode) or not (S1). The recycling print mode is a print mode in which the printing on the sheet 2 by the printer 1 is executed according to the recycling print program.

When the print mode data is not recycling print mode data, that is, when the recycling print mode has not been selected (S1: NO), the CPU 51 executes the normal print program (S2), by which the printing on the sheet 2 is carried out in the normal print mode. The normal print mode is a print mode in which the printing is executed simply according to the image data and the setting of the print method data (single-side printing, duplex printing, N-in-1 printing), without considering the possibility of recycling.

On the other hand, when the print mode data is recycling print mode data, that is, when the recycling print mode has been selected (S1: YES), the CPU 51 judges whether the print method data is N-in-1 printing data (specifying N-in-1 printing) or not (S3).

In the N-in-1 printing, an "arrangement area" is set up on one side of a sheet 2 so that reduced image data (image data of reduced images) of N pages can be arranged and fit in the area, and then reduced image data of X pages (X≦N) are arranged and printed in the arrangement area. For example, when N and X are set at 8 and 6 (N=8, X=6), an arrangement area in which reduced images of eight pages can be arranged and fit is set up on one side of the sheet 2 and then reduced images of six pages are printed in the arrangement area by the N-in-1 printing (8-in-1 printing).

In combination with a judgment on whether the print method data is single-side printing data or duplex printing data (explained below), single-side N-in-1 printing (executing N-in-1 printing on only one side of the sheet 2) and duplex N-in-1 printing (executing N-in-1 printing on both sides of the sheet 2) are possible.

When the print method data is not N-in-1 printing data, that is, when the N-in-1 printing has not been specified (S3: NO), the CPU 51 judges whether the print method data is duplex printing data (specifying duplex printing) or not (S4). When negative, that is, when the duplex printing has not been specified (S4: NO), the CPU 51 judges that the print method data is single-side printing data (advances to a process shown in FIG. 4).

On the other hand, when the duplex printing has been specified (S4: YES), the CPU 51 judges that the print method data is duplex printing data (advances to a process shown in FIG. 5).

When the N-in-1 printing has been specified in S3 (S3: YES), the CPU 51 judges whether the print method data is duplex printing data or not similarly to S4 (S5). When negative, that is, when the duplex printing has not been specified (S5: NO), the CPU 51 judges that the print method data is single-side N-in-1 printing data (advances to a process shown in FIG. 6).

On the other hand, when the duplex printing has been specified (S5: YES), the CPU 51 judges that the print method data is duplex N-in-1 printing data (advances to a process shown in FIG. 7).

In short, the print mode and the print method in regard to the print command are judged by the CPU 51 by the print mode/method judgment process (FIG. 3) described above.

(Single-Side Printing Process in Recycling Mode)

Figure 4:
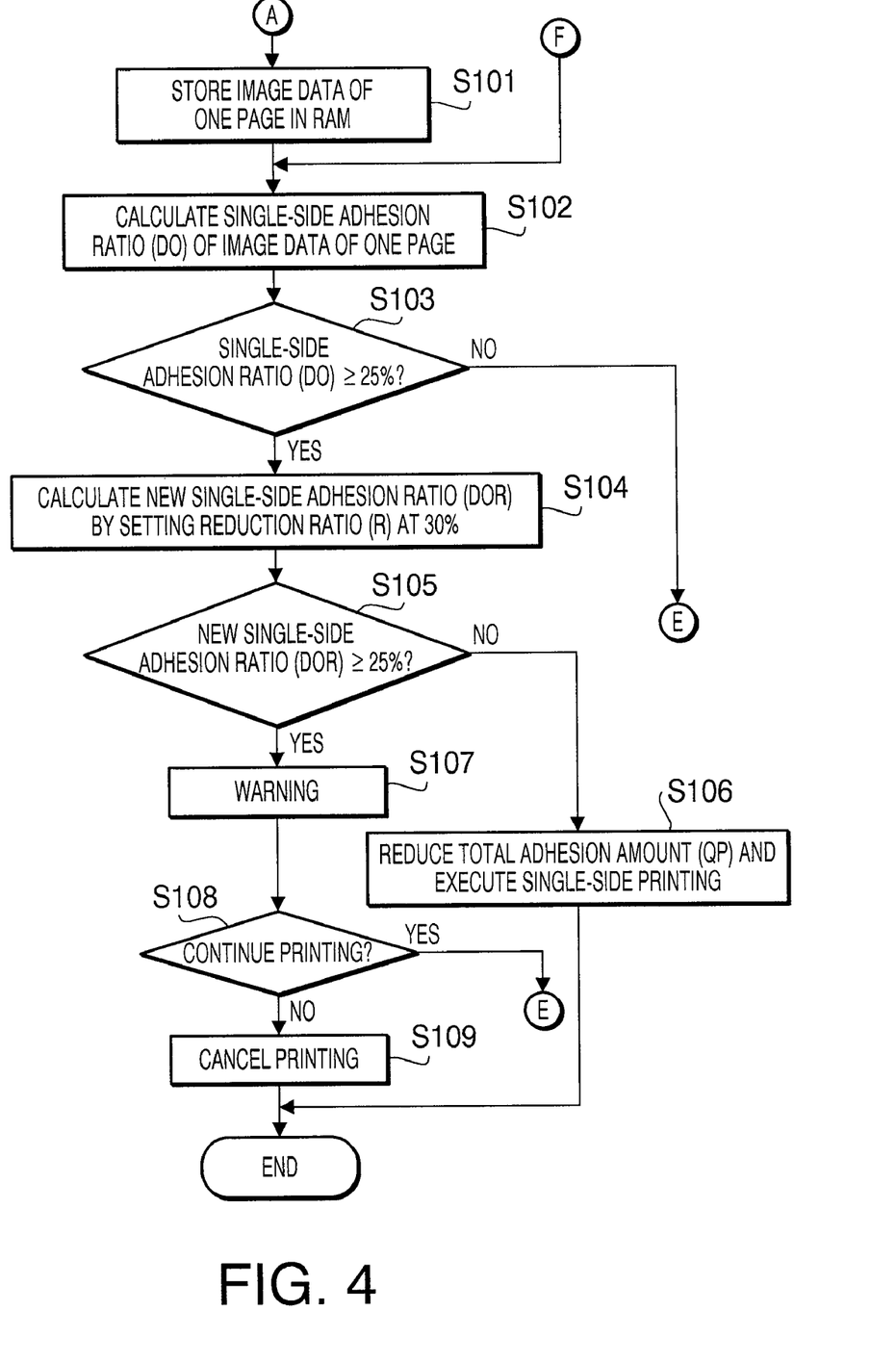
FIG. 4 is a flow chart of a recycling print program for single-side printing which is executed by the CPU.

FIG. 4 is a flow chart of the recycling print program for the single-side printing which is executed by the CPU 51. A process according to the recycling print program for the single-side printing (i.e. single-side printing process in the recycling mode) will be described below referring to FIGS. 3 and 4.

The process of FIG. 4 is executed in the case where the N-in-1 printing has not been specified (S3: NO) and the duplex printing has not been specified (S4: NO) in the process of FIG. 3. First, the CPU 51 stores image data of one page in the RAM 53 (S101).

Subsequently, the CPU 51 calculates a single-side adhesion ratio DO of the toner 16 in the single-side printing (S102) by executing the adhesion ratio calculation program (by comparing the toner adhesion area T per page (total area of toner adhering to one side of the sheet 2) with the area P of the sheet 2).

The toner adhesion area T means the total area of the toner 16 adhering to the sheet 2, which is obtained from the number C of dots of the bitmap data generated from the image data. Thus, the single-side adhesion ratio DO is calculated from the toner adhesion area T and the area P of the sheet 2 as DO=T/P×100 (%). The obtained single-side adhesion ratio DO is stored in the RAM 53 to be used in the subsequent step. Incidentally, the area P of the sheet 2 is obtained from its sheet size.

Subsequently, the CPU 51 judges whether or not the single-side adhesion ratio DO calculated in S102 is 25% or more (S103). The threshold value regarding the adhesion ratio D (e.g. DO) is set at 25% in this embodiment assuming a case where a recycling possibility standard, specifying that the recycling of printed sheets into recycled paper is possible when the adhesion ratio D of the printed sheets 2 is less than 25%, has been presented by a recycling organization.

It goes without saying that the threshold value regarding (to be compared with) the adhesion ratio D, which is set at 25% in this embodiment, should be changed according to the recycling possibility standard when the standard changes. The threshold value of the adhesion ratio D may also be set at a proper value by the user through the upper-level device 55 or the operation unit 59 of the printer 1.

When the single-side adhesion ratio DO is less than 25% (S103: NO), it means that the recycling of the printed sheet 2 (i.e. the sheet 2 after being printed on) is possible even if the printing on the sheet 2 is executed by normal printing. In this case, the CPU 51 advances to the step S2 in FIG. 3 and executes the normal print program, by which the printing on one side of the sheet 2 is carried out by the single-side printing unit in the normal print mode.

On the other hand, when the single-side adhesion ratio DO calculated in S102 is 25% or more (S103: YES), the CPU 51 executes a step of recalculating the single-side adhesion ratio DO on the RAM 53 (S104).

Assuming that a "reduction ratio R" is set at 30% in S104, the single-side adhesion ratio DO is reduced by the recalculation. The reduction ratio R is a value which represents the ratio (percentage) of the decrease in the amount of the toner 16 adhering to the sheet 2 which is caused by the execution of the adhesion amount control program. The new single-side adhesion ratio (DOR) obtained by the recalculation can be expressed as DOR=DO×(1−30/100)=DO×0.7 (%).

Subsequently, the CPU 51 judges whether or not the new single-side adhesion ratio DOR obtained by the recalculation is 25% or more (S105). When DOR is less than 25% (S105: NO), the CPU 51 makes the single-side printing unit execute printing on one side of the sheet 2 in a state in which the total adhesion amount QP of the toner 16 has been reduced by the adhesion amount control program (S106). Thus, even in the single-side printing of image data involving a large total adhesion amount QP (disabling the recycling of the printed sheet 2 if the printing is carried out without modification), single-side printing allowing for the recycling of the printed sheet 2 is made possible by the use of the recycling print program.

In this embodiment, the reduction of the total adhesion amount QP of the toner 16 is implemented by a process of subtracting an amount corresponding to the reduction ratio R from the total adhesion amount QP of the toner 16 that should be used in the normal printing. The reduction ratio R is set at 30% in this embodiment since excessive adjustment (reduction ratio R>30%) causes an extreme decrease in the total adhesion amount QP of the toner 16 in the actual printing on the sheet 2 (unduly thin printed image) and deterioration of print quality.

However, the reduction ratio R does not have to be restricted to 30% when the printing has to be carried out even with a higher reduction ratio R. The reduction ratio R may also be set at a proper value by the user through the upper-level device 55 or the operation unit 59 of the printer 1.

The method of controlling the total adhesion amount QP of the toner 16 adhering to the sheet 2 employed by the adhesion amount control program is not restricted to the method described above; it is also possible to calculate DOR=DO×(1−R/100) (%) (in regard to various reduction ratios R) by use of the single-side adhesion ratio DO obtained in S102 and control the total adhesion amount QP using a reduction ratio R that barely allows DOR<25%.

When the new single-side adhesion ratio DOR obtained by the recalculation in S104 is 25% or more in S105 (S105: YES), a warning for informing the user that the printing in the recycling mode is impossible is displayed on the display of the upper-level device 55 or the display unit 60 of the printer 1 (S107).

Thereafter, whether to continue the printing in spite of the warning displayed in S107 or not is selected by the user through the upper-level device 55 or the operation unit 59 of the printer 1, and the CPU 51 judges the result of the selection (S108).

When continuation of the printing has been selected by the user (S108: YES), the CPU 51 advances to the step S2 in FIG. 3 and makes the single-side printing unit execute printing on one side of the sheet 2 according to the normal print program. However, the sheet 2 is made non-recyclable by the printing in this case since the new single-side adhesion ratio DOR is 25% or more.

On the other hand, when cancellation of the printing has been selected by the user (S108: NO), the CPU 51 cancels the printing (S109).

Since the warning is issued in S107 when the printing in the recycling mode is impossible, the user understands that the printing of the current image data on the sheet 2 while keeping the sheet 2 recyclable is impossible.

(Duplex Printing Process in Recycling Mode)

Figure 5:
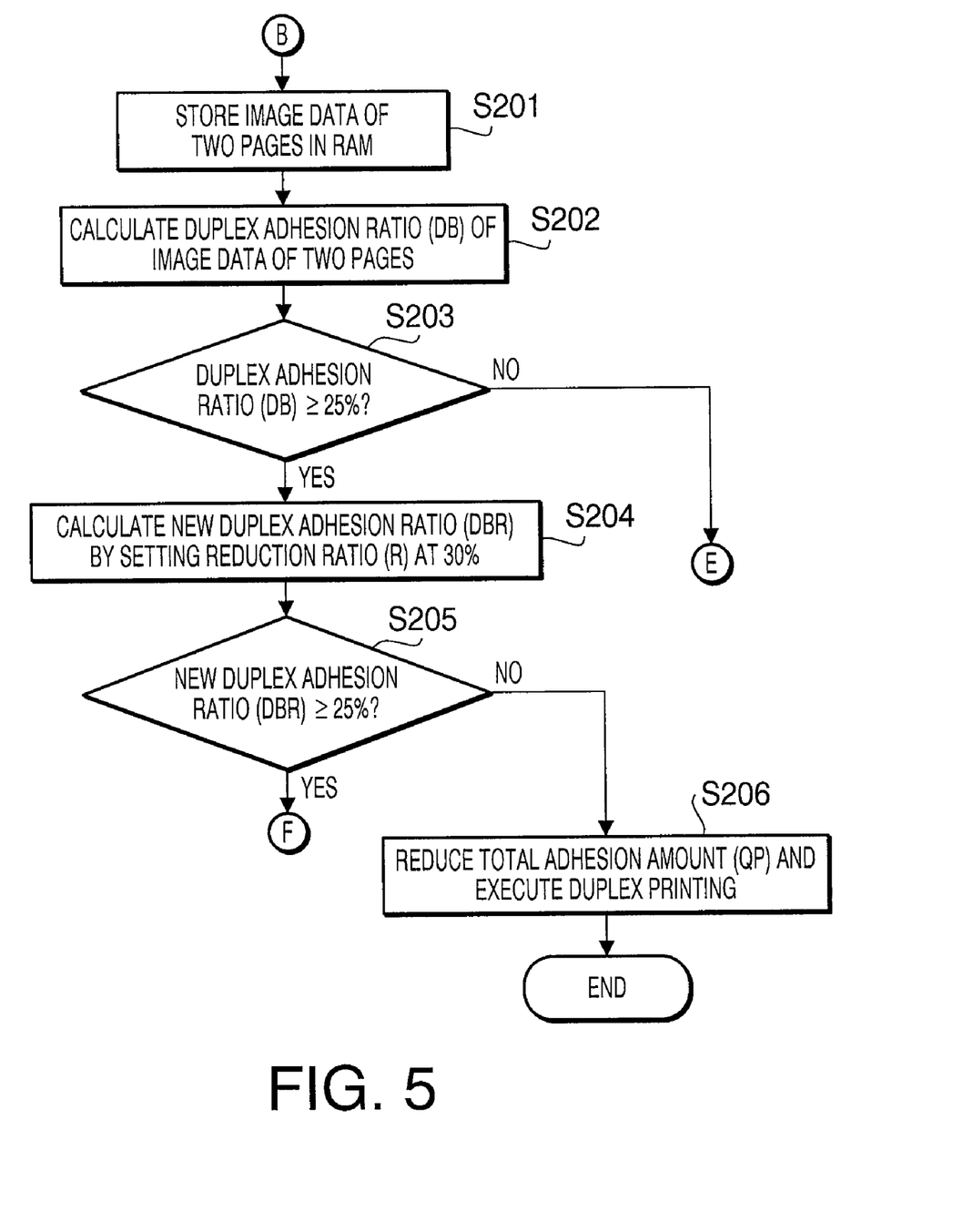
FIG. 5 is a flow chart of a recycling print program for duplex printing which is executed by the CPU.

FIG. 5 and FIG. 4 are flow charts of the recycling print program for the duplex printing which is executed by the CPU 51. A process according to the recycling print program for the duplex printing (i.e. duplex printing process in the recycling mode) will be described below referring to FIGS. 3, 4 and 5.

The process of FIG. 5 is executed in the case where the N-in-1 printing has not been specified (S3: NO) and the duplex printing has been specified (S4: YES) in the process of FIG. 3. First, the CPU 51 stores image data of two pages in the RAM 53 (S201).

Subsequently, the CPU 51 calculates a duplex adhesion ratio DB of the toner 16 in the duplex printing (S202) by executing the adhesion ratio calculation program (by comparing the toner adhesion area T on two pages (total area of toner adhering to two sides of the sheet 2) with the area P of the sheet 2).

The "toner adhesion area T on two pages" means the total area of the toner 16 adhering to the sheet 2 in the duplex printing, which is obtained from the number C of dots of the bitmap data of two pages generated from the image data. Thus, the duplex adhesion ratio DB is calculated from the toner adhesion areas T1 and T2 (regarding the two pages as the targets of the duplex printing) and the area P of the sheet 2 as DB=(T1+T2)/P×100 (%). The obtained duplex adhesion ratio DB is stored in the RAM 53 to be used in the subsequent step.

Subsequently, the CPU 51 judges whether or not the duplex adhesion ratio DB calculated in S202 is 25% or more (S203). When the duplex adhesion ratio DB is less than 25% (S203: NO), it means that the sheet 2 remains recyclable even with the normal printing. Thus, the CPU 51 executes the normal print program in the step S2 in FIG. 3, by which the printing on both sides of the sheet 2 is executed by the duplex printing unit in the normal print mode.

On the other hand, when the duplex adhesion ratio DB calculated in S202 is 25% or more (S203: YES), the CPU 51 executes a step of recalculating the duplex adhesion ratio DB on the RAM 53 (S204).

Assuming that the reduction ratio R is set at 30% in S204, the duplex adhesion ratio DB is reduced by the recalculation. The new duplex adhesion ratio (DBR) obtained by the recalculation can be expressed as DBR=DB×(1−30/100)=DB×0.7 (%).

Subsequently, the CPU 51 judges whether or not the recalculated duplex adhesion ratio DBR is 25% or more (S205). When DBR is less than 25% (S205: NO), the CPU 51 makes the duplex printing unit execute printing on both sides of the sheet 2 in a state in which the total adhesion amount QP of the toner 16 has been reduced by the adhesion amount control program (S206). Thus, even in the duplex printing of image data involving a large total adhesion amount QP (disabling the recycling of the printed sheet 2 if the printing is carried out without modification), duplex printing allowing for the recycling of the printed sheet 2 is made possible by the use of the recycling print program.

When the new duplex adhesion ratio DBR obtained by the recalculation in S204 is 25% or more in S205 (S205: YES), the CPU 51 advances to the step S102 in FIG. 4 and calculates the single-side adhesion ratio DO of the image data of each of the two pages which have been stored in the RAM 53 in S201 by executing the adhesion ratio calculation program. Thereafter, the steps for the single-side printing process (S102-S108, S2) are executed for each of the two pages.

In this case, when the single-side adhesion ratio DO is less than 25% (S103: NO) or when the new single-side adhesion ratio DOR obtained by the recalculation is less than 25% (S105: NO), the CPU 51 makes the single-side printing unit execute the printing on one side of the sheet 2 in the step S2 in FIG. 3 or in the step S106. Consequently, only one side of the sheet 2 is printed on even though the print method data has been judged to be duplex printing data in S3-S4 in FIG. 3.

Examples of print images in this case will be explained referring to FIGS. 8A-8C and FIGS. 9A-9D. FIGS. 8A-8C are schematic diagrams showing a case where single-side printing is carried out for a duplex print command.

Figure 8A:
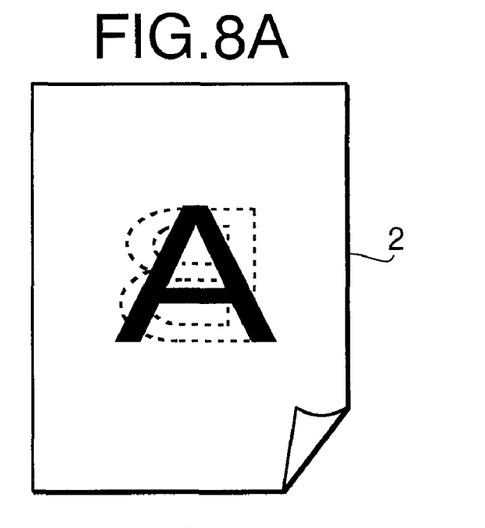
FIGS. 8A-8C are schematic diagrams showing examples of print images in a case where single-side printing is carried out for a duplex print command.

FIG. 8A indicates that the inputted print command is a duplex print command, wherein the character "A" drawn with solid lines represents a print image that should be formed on the front of the sheet 2, while the horizontally inverted character "B" drawn with broken lines represents a print image that should be formed on the back of the sheet 2. Meanwhile, FIGS. 8B and 8C indicate the above case where the image data of two pages (which should be printed on both sides of the sheet 2 as shown in FIG. 8A) are separately printed on two sheets 2 by the single-side printing. In this case, the inputted duplex print command results in the single-side printing on two sheets 2.

When the recalculated single-side adhesion ratio DOR is 25% or more (S105: YES) and the continuation of the printing is selected by the user (S108: YES), the CPU 51 advances to the step S2 in FIG. 3 and makes the single-side printing unit execute printing on one side of the sheet 2 according to the normal print program, similarly to the processing in the single-side printing process explained above.

Incidentally, in cases where the recalculated single-side adhesion ratio DOR is 25% or more (S105: YES) and the continuation of the printing is selected by the user (S108: YES) for both of the two pages stored in the RAM 53 in S201, the CPU 51 may also make the duplex printing unit carry out the duplex printing on the sheet 2 according to the normal print program in the step S2 in FIG. 3, after finishing the processing for the two pieces of image data (two pages).

(Single-Side N-in-1 Printing Process in Recycling Mode)

Figure 6:
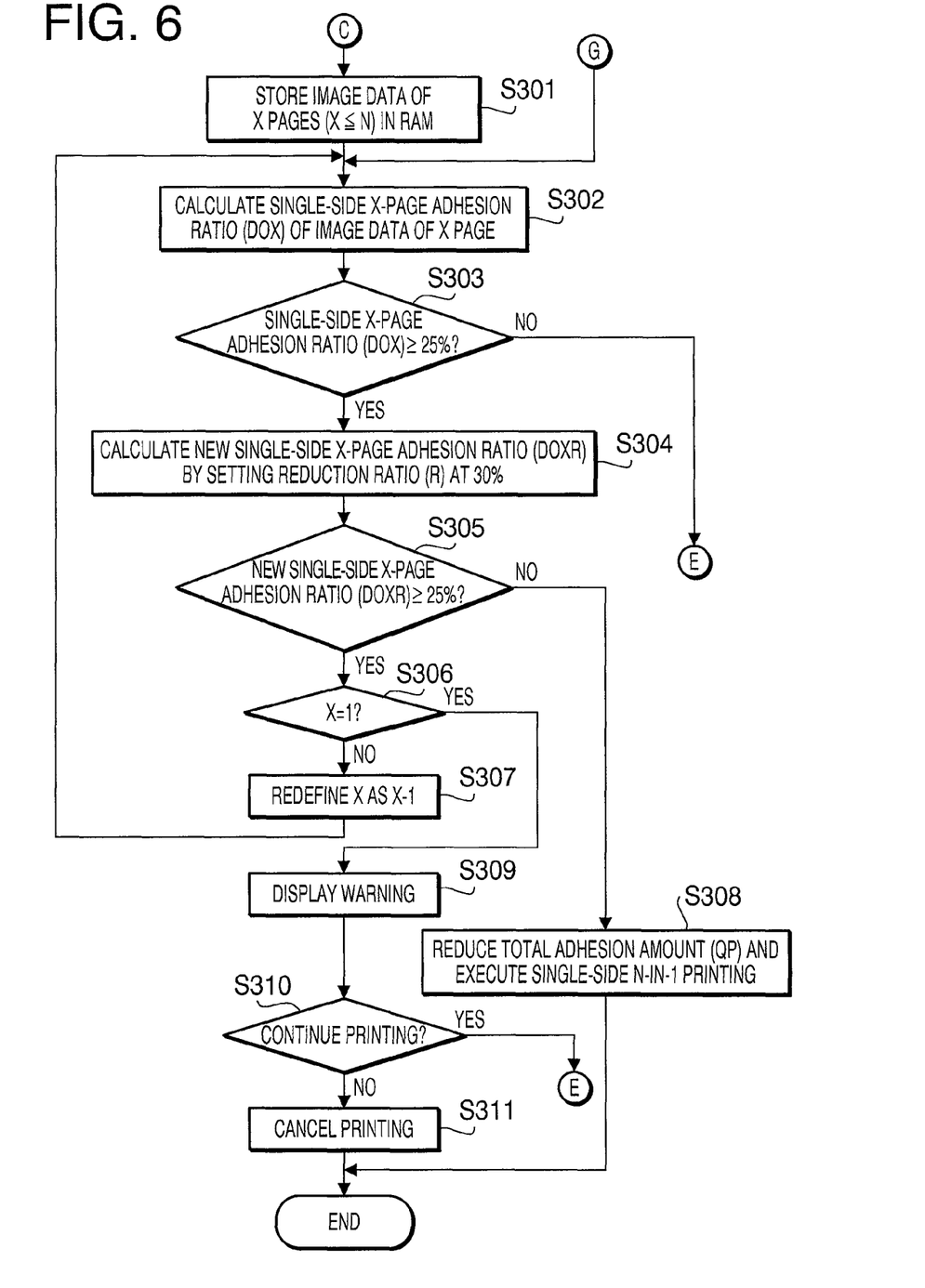
FIG. 6 is a flow chart of a recycling print program for single-side N-in-1 printing which is executed by the CPU.

FIG. 6 is a flow chart of the recycling print program for the single-side N-in-1 printing which is executed by the CPU 51. A process according to the recycling print program for the single-side N-in-1 printing (i.e. single-side N-in-1 printing process in the recycling mode) will be described below referring to FIGS. 3 and 6.

The process of FIG. 6 is executed in the case where the N-in-1 printing has been specified (S3: YES) and the duplex printing has not been specified (S5: NO) in the process of FIG. 3. First, the CPU 51 stores image data of X pages in the RAM 53 (S301). Since the maximum number of pieces of image data that can be printed on one side of the sheet 2 is N, the number X of pages of image data stored in the RAM 53 is smaller than or equal to N (X≦N).

Subsequently, the CPU 51 calculates a single-side X-page adhesion ratio DOX of the toner 16 in the single-side printing (S302) by executing the adhesion ratio calculation program (by comparing toner adhesion area TOX (the area of toner adhering to one side of the sheet 2 for the printing of the reduced images of the X pages) with the area P of the sheet 2).

The single-side X-page adhesion ratio DOX is calculated from the toner adhesion area TOX and the area P of the sheet 2 as DOX=TOX/P×100 (%). The obtained single-side X-page adhesion ratio DOX is stored in the RAM 53 to be used in the subsequent step.

Subsequently, the CPU 51 judges whether or not the single-side X-page adhesion ratio DOX calculated in S302 is 25% or more (S303). When the single-side X-page adhesion ratio DOX is 25% or more (S303: YES), the CPU 51 executes a step of recalculating the single-side X-page adhesion ratio DOX on the RAM 53 (S304).

Assuming that the reduction ratio R is set at 30% in S304, the single-side X-page adhesion ratio DOX is reduced by the recalculation. The new single-side X-page adhesion ratio (DOXR) obtained by the recalculation can be expressed as DOXR=DOX×(1-30/100)=DOX×0.7(%).

Subsequently, the CPU 51 judges whether or not the recalculated single-side X-page adhesion ratio DOXR is 25% or more (S305). When DOXR is 25% or more (S305: YES), the CPU 51 judges whether the number X of pages of image data is 1 or not (S306).

When X≠1 (S306: NO), the CPU 51 redefines the number X of pages of image data as X−1 (X=X−1), that is, reduces the number X by 1 (S307).

After the redefinition of the number X of pages (S307), the CPU 51 returns to the step S302 to repeat the above steps S302-S307 for the redefined X pages.

When the single-side X-page adhesion ratio DOX calculated in S302 is less than 25% in S303 (S303: NO), the CPU 51 advances to the step S2 in FIG. 3 and makes the multiple-page printing unit execute the N-in-1 printing on one side of the sheet 2. In this case, the N-in-1 printing on one side of the sheet 2 is carried out using the image data of the X pages which have been stored in the RAM 53 in S301 or the image data of the X pages redefined in S307.

When the new single-side X-page adhesion ratio DOXR obtained by the recalculation in S304 is less than 25% in S305 (S305: NO), the CPU 51 makes the multiple-page printing unit execute the N-in-1 printing on one side of the sheet 2 in a state in which the total adhesion amount QP of the toner 16 has been reduced by the adhesion amount control program (S308). The N-in-1 printing on one side of the sheet 2 in this step S308 is carried out using the image data of the X pages which have been stored in the RAM 53 in S301 or the image data of the X pages redefined in S307.

Thus, even in the single-side N-in-1 printing of image data involving a large total adhesion amount QP (disabling the recycling of the printed sheet 2 if the printing is carried out without modification in S2 in FIG. 3), single-side N-in-1 printing allowing for the recycling of the printed sheet 2 is made possible by the use of the recycling print program.

Examples of print images in this case (S2 in FIG. 3, S308) will be explained referring to FIGS. 9A-9D. FIGS. 9A-9D are schematic diagrams showing a case where single-side N-in-1 printing of image data of X pages is carried out for an N-in-1 print command.

Figure 9A:
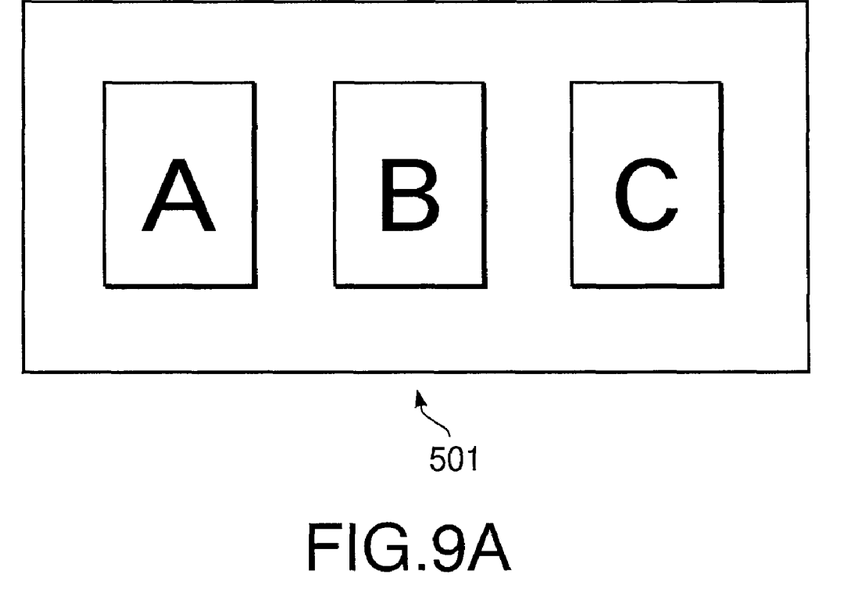
FIGS. 9A-9D are schematic diagrams showing examples of print images in a case where single-side N-in-1 printing of image data of X pages is carried out for an N-in-1 print command.
Figure 9B:
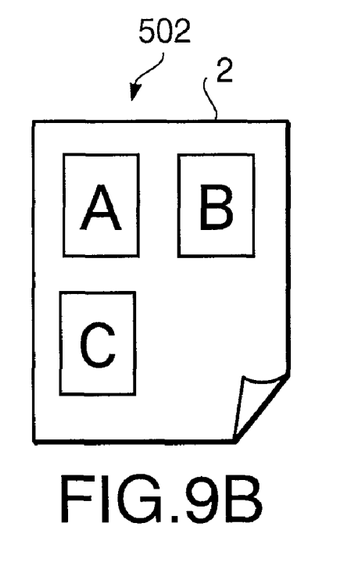
Figure 9C:
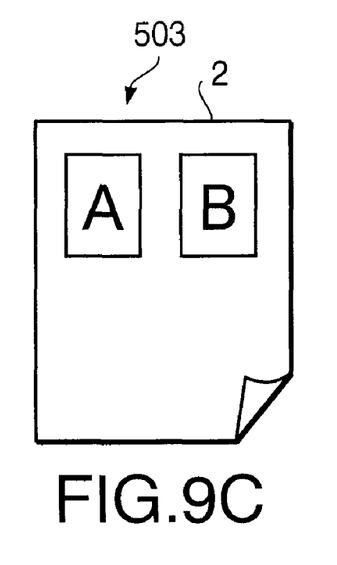
Figure 9D:
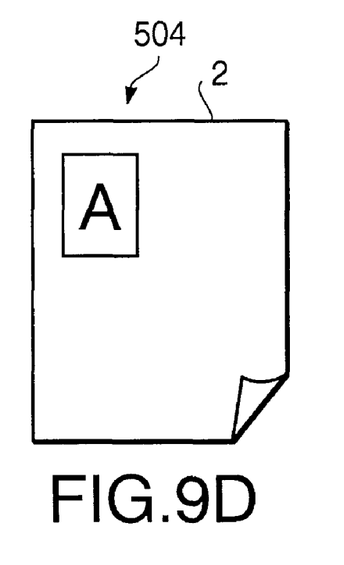

This explanation will be given assuming that image data indicated by an image data example 501 shown in FIG. 9A (X=3) have been stored in the RAM 53 in S301 and 4-in-1 printing has been specified by the print method data. First, when the single-side X-page adhesion ratio DOX is judged to be less than 25% (S303: NO) or the recalculated single-side X-page adhesion ratio DOXR is judged to be less than 25% (S305: NO) in the first execution of the step S303 or S305, the printing is executed as indicated by a first print image example 502 shown in FIG. 9B.

However, when the single-side X-page adhesion ratio DOX is judged to be 25% or more (S303: YES) and the recalculated single-side X-page adhesion ratio DOXR is also judged to be 25% or more (S305: YES) in the first execution of S303 and S305, the CPU 51 deletes image data of one page from the target of the N-in-1 (4-in-1) printing (X=2) in S307, returns to S302, and makes the judgments of S303 and S305 as the second execution.

When the single-side X-page adhesion ratio DOX is judged to be less than 25% (S303: NO) or the recalculated single-side X-page adhesion ratio DOXR is judged to be less than 25% (S305: NO) in the second execution of S303 and S305, the printing is executed as indicated by a second print image example 503 shown in FIG. 9C.

Thereafter, when the single-side X-page adhesion ratio DOX and the recalculated single-side X-page adhesion ratio DOXR are still judged to be 25% or more (S303: YES, S305: YES), the above processing is continued until the number X of pages of image data to be printed is judged to be 1 (X=1) in the step S306. In this case, the printing on the sheet 2 is executed as indicated by a third print image example 504 shown in FIG. 9D.

In the case where the number X of pages of image data is judged to be 1 (X=1) in S306 (S306: YES), a warning for informing the user that the printing in the recycling mode is impossible is displayed on the display of the upper-level device 55 or the display unit 60 of the printer 1 (S309).

Thereafter, whether to continue the printing in spite of the warning displayed in S309 or not is selected by the user through the upper-level device 55 or the operation unit 59 of the printer 1, and the CPU 51 judges the result of the selection (S310).

When continuation of the printing has been selected by the user (S310: YES), the CPU 51 advances to the step S2 in FIG. 3 and makes the multiple-page printing unit execute the N-in-1 printing on one side of the sheet 2 by use of the image data of X pages which have been stored in the RAM 53 in S301. However, the sheet 2 is made non-recyclable by the printing in this case since the single-side X-page adhesion ratio DOX calculated in the first execution of S302 is 25% or more.

On the other hand, when cancellation of the printing has been selected by the user (S310: NO), the CPU 51 cancels the printing (S311).

Since the warning is issued in S309 when the printing in the recycling mode is impossible, the user understands that the printing of the particular image data on the sheet 2 while keeping the sheet 2 recyclable is impossible in this case.

Incidentally, each piece of image data (page) deleted from the target of the N-in-1 printing in S307 is stored in the RAM 53 as print target image data when the next print command is executed.

(Duplex N-in-1 Printing Process in Recycling Mode)

Figure 7:
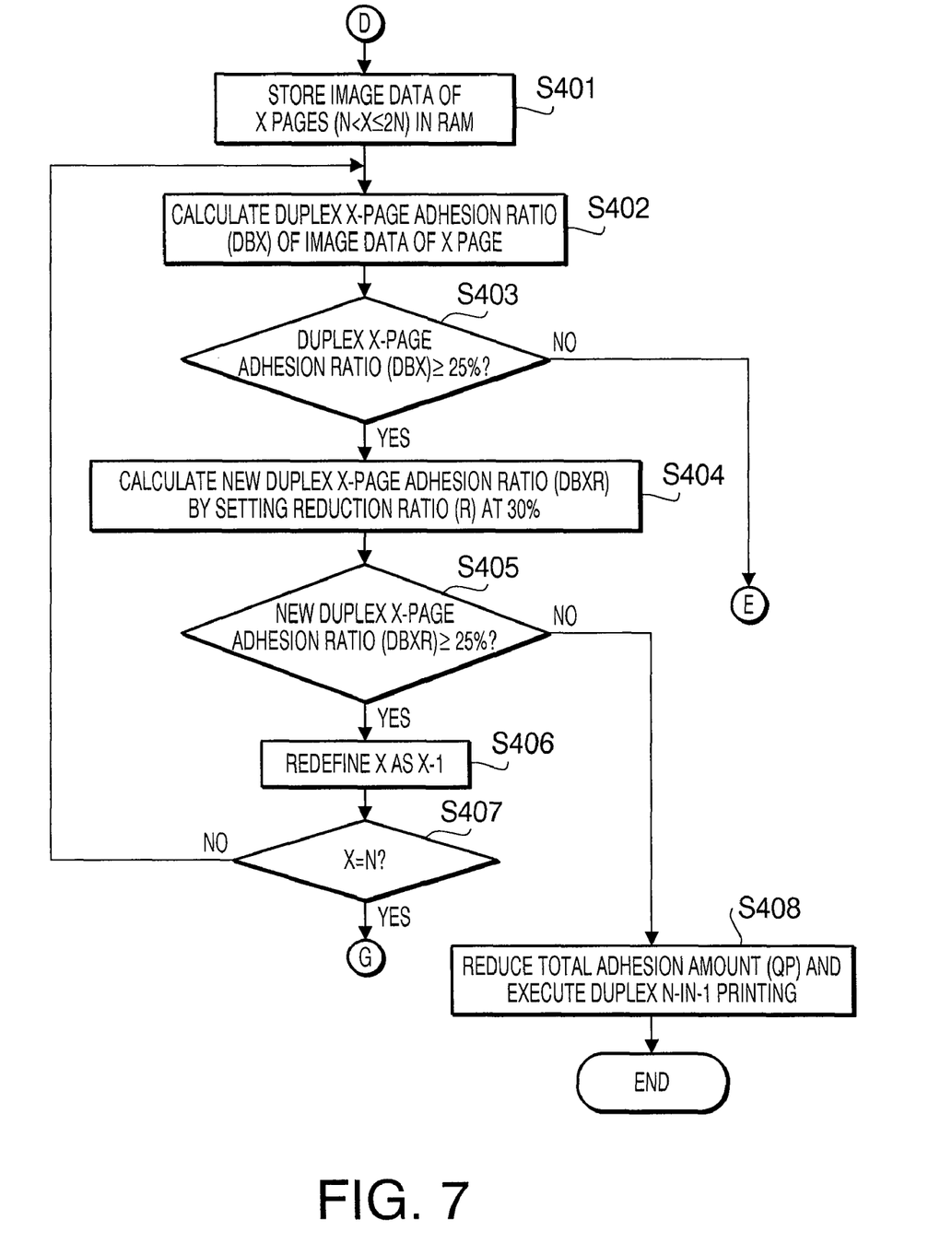
FIG. 7 is a flow chart of a recycling print program for duplex N-in-1 printing which is executed by the CPU.
Figure 8B:
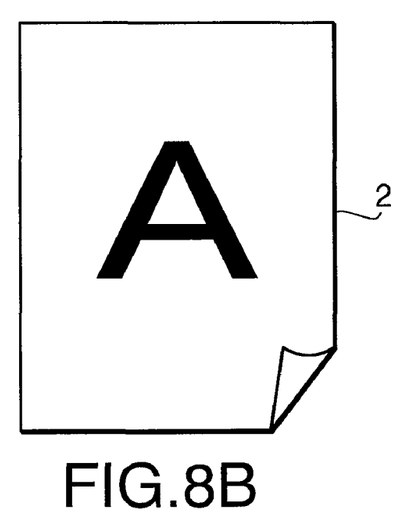
Figure 8C:
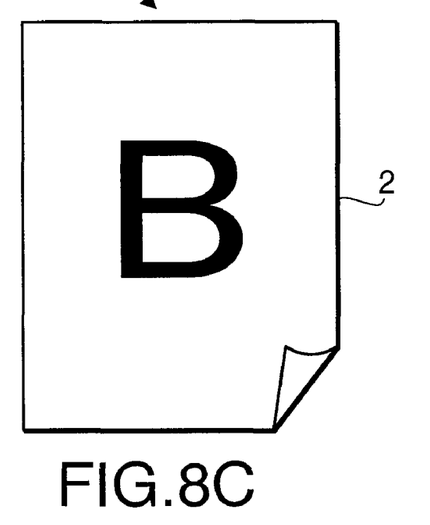

FIG. 7 and FIG. 6 are flow charts of the recycling print program for the duplex N-in-1 printing which is executed by the CPU 51. A process according to the recycling print program for the duplex N-in-1 printing (i.e. duplex N-in-1 printing process in the recycling mode) will be described below referring to FIGS. 3, 6 and 7.

The process of FIG. 7 is executed in the case where the N-in-1 printing has been specified (S3: YES) and the duplex printing has been specified (S5: YES) in the process of FIG. 3. First, the CPU 51 stores image data of X pages in the RAM 53 (S401). Since the maximum number of pieces of image data that can be printed on two sides of the sheet 2 is 2N, the number X of pages of image data stored in the RAM 53 is larger than N and smaller than or equal to 2N (N<X≦2N).

Subsequently, the CPU 51 calculates a duplex X-page adhesion ratio DBX of the toner 16 in the duplex printing (S402) by executing the adhesion ratio calculation program (by comparing toner adhesion area TBX (the area of toner adhering to two sides of the sheet 2 for the printing of the reduced images of the X pages) with the area P of the sheet 2).

The duplex X-page adhesion ratio DBX is calculated from the toner adhesion area TBX and the area P of the sheet 2 as DBX=TBX/P×100 (%). The obtained duplex X-page adhesion ratio DBX is stored in the RAM 53 to be used in the subsequent step.

Subsequently, the CPU 51 judges whether or not the duplex X-page adhesion ratio DBX calculated in S402 is 25% or more (S403). When the duplex X-page adhesion ratio DBX is 25% or more (S403: YES), the CPU 51 executes a step of recalculating the duplex X-page adhesion ratio DBX on the RAM 53 (S404).

Assuming that the reduction ratio R is set at 30% in S404, the duplex X-page adhesion ratio DBX is reduced by the recalculation. The new duplex X-page adhesion ratio (DBXR) obtained by the recalculation can be expressed as DBXR=DBX×(1−30/100)=DBX×0.7 (%).

Subsequently, the CPU 51 judges whether or not the recalculated duplex X-page adhesion ratio DBXR is 25% or more (S405). When DBXR is 25% or more (S405: YES), the CPU 51 redefines the number X of pages of image data as X−1 (X=X−1), that is, reduces the number X by 1 (S406).

After the redefinition of the number X of pages (S406), the CPU 51 judges whether the number X of pages of image data is N or not (S407). When X≠N (S407: NO), the CPU 51 returns to the step S402 to repeat the above steps S402-S407 for the redefined X pages.

When the duplex X-page adhesion ratio DBX calculated in S402 is less than 25% in S403 (S403: NO), the CPU 51 advances to the step S2 in FIG. 3 and makes the multiple-page printing unit execute the N-in-1 printing on both sides of the sheet 2. In this case, the N-in-1 printing on both sides of the sheet 2 is carried out using the image data of the X pages which have been stored in the RAM 53 in S401 or the image data of the X pages redefined in S406.

When the new duplex X-page adhesion ratio DBXR obtained by the recalculation in S404 is less than 25% in S405 (S405: NO), the CPU 51 makes the multiple-page printing unit execute the N-in-1 printing on both sides of the sheet 2 in a state in which the total adhesion amount QP of the toner 16 has been reduced by the adhesion amount control program (S408). The N-in-1 printing on both sides of the sheet 2 in this step S408 is carried out using the image data of the X pages which have been stored in the RAM 53 in S401 or the image data of the X pages redefined in S406.

Thus, even in the duplex N-in-1 printing of image data involving a large total adhesion amount QP (disabling the recycling of the printed sheet 2 if the printing is carried out without modification in S2 in FIG. 3), duplex N-in-1 printing allowing for the recycling of the printed sheet 2 is made possible by the use of the recycling print program.

When the number X of pages of image data is N (X=N) in S407 (S407: YES), the CPU 51 advances to the step S302 in FIG. 6 and calculates the single-side X-page adhesion ratio DOX of the image data of the X pages (which have just been redefined in S406 in FIG. 7) by executing the adhesion ratio calculation program. Thereafter, the CPU 51 executes the aforementioned steps of the single-side N-in-1 printing process (S302-S311, S2) for the image data.

In this case, when the single-side X-page adhesion ratio DOX is judged to be less than 25% (S303: NO) or the recalculated single-side X-page adhesion ratio DOXR is judged to be less than 25% (S305: NO), the CPU 51 makes the multiple-page printing unit execute the N-in-1 printing on one side of the sheet 2 in the step S2 in FIG. 3 or in the step S308. Consequently, only one side of the sheet 2 undergoes the N-in-1 printing even though the print method data has been judged to be duplex N-in-1 printing data in S3-S5 in FIG. 3.

When the number X of pages of image data is judged to be 1 (X=1) in S306 (S306: YES) and continuation of the printing has been selected by the user in S310 (S310: YES), the CPU 51 advances to the step S2 in FIG. 3 and makes the multiple-page printing unit execute the N-in-1 printing on both sides of the sheet 2 by use of the image data of X pages which have been stored in the RAM 53 in S401. However, the sheet 2 is made non-recyclable by the printing in this case since the duplex X-page adhesion ratio DBX calculated in the first execution of S402 is 25% or more.

Incidentally, each piece of image data (page) deleted from the target of the N-in-1 printing in S307 or S406 is stored in the RAM 53 as print target image data when the next print command is executed.

<Modifications>

While the process for reducing the total adhesion amount QP (the control of the dot adhesion amount QD of the toner 16 per dot, the control of the number C of dots of the toner 16, etc.) and the process of switching the print method from the duplex printing to the single-side printing are employed in combination in the above embodiment when the total adhesion amount QP is too large in the duplex printing process or duplex N to 1 printing process in the recycling mode, it is also possible to employ only one processing method selected from the reduction of the total adhesion amount QP and the switching of the print method to the single-side printing, or to let the user arbitrarily select a proper combination of processing methods.

While the notification (warning) to the user and the selection on whether the printing should be continued or not are made only in the steps S107 and S108 or in the steps S309 and S310 in the above embodiment, it is also possible to execute such steps (of notifying the user about the type of the printing which is going to be executed (print method, print mode, etc.) and letting the user select whether the printing should be continued or not) immediately before each printing step (S2, S106, S206, S308, S408).

While the printing of a prescribed number of pieces of image data (prescribed number of pages) corresponding to the print method specified by the original print method data (1 page in the single-side printing, 2 pages in the duplex printing, X pages in the N-in-1 printing) is controlled as one cycle and the printing is carried out in units of the cycles in the above embodiment, the control may also be carried out by employing the same print method (processing method) for all the pages of consecutive image data.

Specifically, the process of each print method may be returned to its first step (S101, S201, S301, S401) immediately before the printing step (S2, S106, S206, S308, S408), and the print method data at that time and the result of the judgment by the judgment unit (on whether the process for reducing the total adhesion amount QP of the toner 16 should be executed by the adhesion amount control program or not) may be stored in the RAM 53.

Thereafter, remaining pieces of the consecutive image data are processed in the same way. When the processing of the last piece of image data is finished, an appropriate common print method (processing method) may be determined by referring to all the print method data and the results of judgment by the judgment unit (on whether the process for reducing the total adhesion amount QP should be executed by the adhesion amount control program or not) which have been stored in the RAM 53, and the printing may be carried out for all the pages of the consecutive image data by the common print method (processing method).

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

What is claimed is:

1. A printing device comprising:
   a printing unit which prints an image on a sheet according to a print command;
   a processor; and
   memory operative coupled to the processor and storing computer readable instructions that, when executed by processor, provide
      a judgment unit which judges whether a total adhesion amount of a print agent adhering to the sheet for the image printing exceeds a prescribed threshold value based on inputted print data; and
      a control unit for reducing the total adhesion amount of the print agent per dot on the sheet without changing the size of each dot when the total adhesion amount is judged by the judgment unit to exceed the threshold value.

2. The printing device according to claim 1, wherein the judgment unit includes a calculation unit which calculates the total adhesion amount based on the print data.

3. The printing device according to claim 1, wherein the judgment unit calculates the total adhesion amount based on adhesion ratio of the print agent adhering to the sheet.

4. The printing device according to claim 1, wherein the control unit reduces the number of dots printed on the sheet when the total adhesion amount is judged to exceed the threshold value by the judgment unit.

5. The printing device according to claim 1,
   wherein the printing unit includes a multiple-page printing unit which prints the print data of multiple pages on one sheet according to a multiple-page print command, and
   wherein the control unit reduces the number of pages of the print data printed on one sheet when the total adhesion amount is judged to exceed the threshold value by the judgment unit in the image printing according to the multiple-page print command.

6. The printing device according to claim 1,
   wherein the printing unit includes a single-side printing unit which executes image printing on one side of the sheet according to a single-side print command and a duplex printing unit which executes image printing on both sides of the sheet according to a duplex print command, and
   wherein the control unit causes the single-side printing unit to execute the image printing on one side of the sheet when the total adhesion amount is judged to exceed the threshold value by the judgment unit in the image printing according to the duplex print command.

7. The printing device according to claim 1, further comprising a setting unit which allows a user to set the threshold value.

8. The printing device according to claim 1, wherein in the printing of print data extending for multiple sheets, the judgment unit judges whether the total adhesion amount of the print agent exceeds the threshold value for each of the multiple sheets and the control unit reduces the total adhesion amount of the print agent for all the multiple sheets based on the judgment by the judgment unit.

9. The printing device according to claim 1, further comprising a selection unit which allows a user to select whether to cause the control unit to reduce the total adhesion amount of the print agent.

10. A printing system comprising:
    an upper-level device which forms print data;
    a lower-level device which prints an image on a sheet according to the print data formed by the upper-level device;
    a processor; and
    memory operative coupled to the processor and storing computer readable instructions that, when executed by processor, provide
       a judgment unit which judges whether a total adhesion amount of a print agent adhering to the sheet for the image printing exceeds a prescribed threshold value based on the print data; and
       a control unit for reducing the total adhesion amount of the print agent per dot on the sheet without changing the size of each dot when the total adhesion amount is judged by the judgment unit to exceed the threshold value.

11. A printing method for a printing device which prints an image by adhering print agent on a sheet, comprising the steps of:
    setting a threshold value of an amount of print agent per sheet as a prescribed threshold value;
    calculating a total adhesion amount of the print agent per sheet based on inputted print data and an inputted print command;
    judging whether the total adhesion amount of the print agent per sheet exceeds the prescribed threshold value; and
    reducing the total adhesion amount of the print agent per dot on the sheet without changing the size of each dot when the total adhesion amount is judged to exceed the prescribed threshold value.

12. The printing method according to claim 11, wherein the step of reducing reduces the total adhesion amount of the print agent per sheet by reducing the number of dots printed on the sheet when the total adhesion amount is judged to exceed the prescribed threshold value.

13. The printing method according to claim 11, wherein the step of reducing reduces the total adhesion amount of the print agent per sheet by reducing a printing area on one sheet when the total adhesion amount is judged to exceed the prescribed threshold value.

14. The printing method according to claim 13, wherein the step of reducing reduces the total adhesion amount of the print agent per sheet by reducing the number of pages printed on one sheet when the inputted print command includes a command for printing a plurality of pages on one sheet.

15. The printing method according to claim 13, wherein, when the inputted print command includes a command for printing on both sides of the sheet, the step of reducing reduces the total adhesion amount of the print agent per sheet by printing only one side of the sheet.

* * * * *